United States Patent
Karlsson et al.

(10) Patent No.: US 6,553,231 B1
(45) Date of Patent: Apr. 22, 2003

(54) METHOD AND ARRANGEMENT IN A TELECOMMUNICATION SYSTEM

(75) Inventors: Patrik Karlsson, Älta (SE); Justus Petersson, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/549,670

(22) Filed: Apr. 14, 2000

(30) Foreign Application Priority Data

Apr. 11, 2000 (SE) .............................................. 0001336

(51) Int. Cl.⁷ .............................. H04Q 7/20; H04Q 7/00
(52) U.S. Cl. ...................... 455/436; 455/455; 455/438; 455/439; 455/67.1; 370/331
(58) Field of Search ................................ 370/331, 332; 455/436, 438, 439, 443, 446, 501, 63, 67.1, 442

(56) References Cited

U.S. PATENT DOCUMENTS

| | | | | |
|---|---|---|---|---|
| 5,673,307 A | * | 9/1997 | Holland et al. | 455/436 |
| 5,915,221 A | * | 6/1999 | Sawyer et al. | 455/437 |
| 6,337,983 B1 | * | 1/2002 | Bonta et al. | 370/335 |
| 2001/0055969 A1 | * | 12/2001 | Bonta et al. | 455/436 |

* cited by examiner

*Primary Examiner*—Edward F. Urban
*Assistant Examiner*—Sheila Smith (57) ABSTRACT

The present invention relates to an arrangement and a method to render the handover-related signalling traffic in a Code Division Multiple Access (CDMA)-based communication system more effective by reducing the amount of handover-related signalling traffic that must be sent between user equipment and the network. The arrangement comprises, i.a., a delay unit at least in the user equipment or in both user equipment and an appropriate network unit. The method comprises, i.a., the steps of releasing a communication link to the radio base station of a candidate cell while keeping information about the neighbor cells of said candidate cell for a delay period that is indicated by said delay unit. Accordingly, if a communication link shall be re-established to said candidate cell, its neighbor cells are only retrieved if said a delay period has expired.

22 Claims, 6 Drawing Sheets

METHOD AND ARRANGEMENT IN A TELECOMMUNICATION SYSTEM

FIELD OF THE INVENTION

The present invention relates to Code Division Multiple Access (CDMA)-based communication systems and in particular to an arrangement and a method to reduce the amount of handover-related signalling traffic that must be sent between user equipment and the network.

BACKGROUND OF THE INVENTION

In Code Division Multiple Access (CDMA) communication systems, a plurality of base stations cover each a certain geographic area and provide communication services to users within such areas. Characteristic for CDMA-systems is that the radio spectrum is shared between the different users by assigning specific and unique code sequences to the uplink and downlink channels between base station and user equipment. These code sequences are used by the transmitters to transform signals into wideband spread spectrum signals. In the receiver units, base station or user equipment, said wideband signals from a specific transmitter are retransformed into the original bandwidth by using the same code sequence as that transmitter while signals marked with different codes remain wideband signals and, thus, are interpreted by the receiver as part of the background noise.

An aspect specific to the multiple access technique used in CDMA relates to the fact that all users transmit wideband signals potentially at the same time and using the same frequency spectrum. Thus, one limiting factor in CDMA-based systems is a decreasing signal-to-noise ratio in the communication channels due to an increasing interference level caused by other transmitters. Said signal interference level per cell results from transmitters within said cell as well as from transmitters in the neighbouring cells. A cell in a CDMA-based communication system is not a strictly defined area but merely do cells partly overlap each other at cell borders and, thus, do not form sharp cell borders. This is obvious from the fact that the range of a cell essentially depends on parameters as, e.g., the downlink power level of the radio base station, the number of user equipments in the cell, and environmental effects causing, e.g., fading effects. In particular, a CDMA-based communication system also allows different layers of cells that cover the same geographic area.

From this it becomes apparent that it is a normal case for a user equipment in a CDMA-based communication system to have simultaneous connections to more than one radio base station. With regard to capacity and quality of services, the user equipment must have established radio connections to the best cells, i.e. to the radio base stations that are best according to a certain decision criterion. Therefore, a user equipment must keep track on a number of cells in order to be able to perform the necessary handovers and to achieve optimised communication conditions. This is done by means of a set of measurement cells containing at least all cells from which the user equipment receives a signal. Those cells to which the user equipment has an established connection are contained in the active set, which forms a subset of said measurement set.

It becomes also apparent that the specific kind of cell structure as described above leads to specific requirements in handover situations which is the object of the present invention.

SUMMARY OF THE INVENTION

The present invention relates to an arrangement and a method to render the handover-related signalling traffic in a CDMAbased communication system more effective.

It is a first object of the present invention to achieve a handover method for user equipments that reduces the signalling traffic when performing a handover.

It is in particular an object of the present invention to achieve a handover method that is applicable in case of oscillating handovers between two cells in a CDMA-based communication system.

It is another object of the present invention to achieve a handover method that allows a faster performance of handovers.

It is still another object of the present invention to achieve a handover method that can reduce the amount of signalling information that must be transmitted when performing a handover.

It is yet another object of the present invention to achieve a handover method that can reduce the number of handover decisions.

It is yet another object of the present invention to achieve a user equipment that has established communication links to the best cells in accordance with decision criterions that are applied by both user equipment and an appropriate unit in the network.

Briefly, these and other objects of the present invention are accomplished by the arrangement and method according to the present invention. Said arrangement comprises, i.a., a delay unit that can be implemented solely in the user equipment or in both user equipment and an appropriate unit in the network, e.g., in the radio network controller or the radio base station. The delay unit indicates a delay period for cells that shall be removed from the measurement set of a user equipment. Said method comprises, i.a., the step of releasing a communication link to the radio base station of a cell, i.e. removing its cell identity from the active set to the measurement set of a user equipment, while keeping information about its neighbour cells, which have no other neighbour cell in the modified active set, for a time period that is indicated by said delay unit. Information about said neighbour cells can be kept, e.g., in the measurement set. The neighbour cells of a cell that shall be included in the active set are only retrieved if this cell shall be included for the first time in an oscillating phase or if the delay period has expired. A delay unit that is implemented in both user equipment and an appropriate unit in the network saves for the user equipment the additional step of retrieving neighbour cells for which a delay period has expired because the network is aware of this fact and will send said neighbour cells automatically.

As a first advantage, the present invention allows to reduce the amount of signalling traffic due to the fact that neighbour cells are only sent when a cell is included in the active set for the first time in an oscillating phase or if a delay period has expired.

It is thus an advantage that information about neighbour cells of a cell to which a user equipment intends to establish a communication link need only to be retrieved once from the network when performing an oscillating handover.

It is another advantage that the number of handover decisions can be reduced.

It is still another advantage of the present invention that the user equipment will have established communication links to the best cells in accordance with decision criterions that are applied by the user equipment and an appropriate unit in the network.

Other objects, advantages and novel features of the invention will become apparent from the following detailed

BRIEF DESCRIPTION OF THE DRAWINGS

For a better understanding, reference is made to the following drawings and preferred embodiments of the invention.

DETAILED DESCRIPTION

Figure 1:
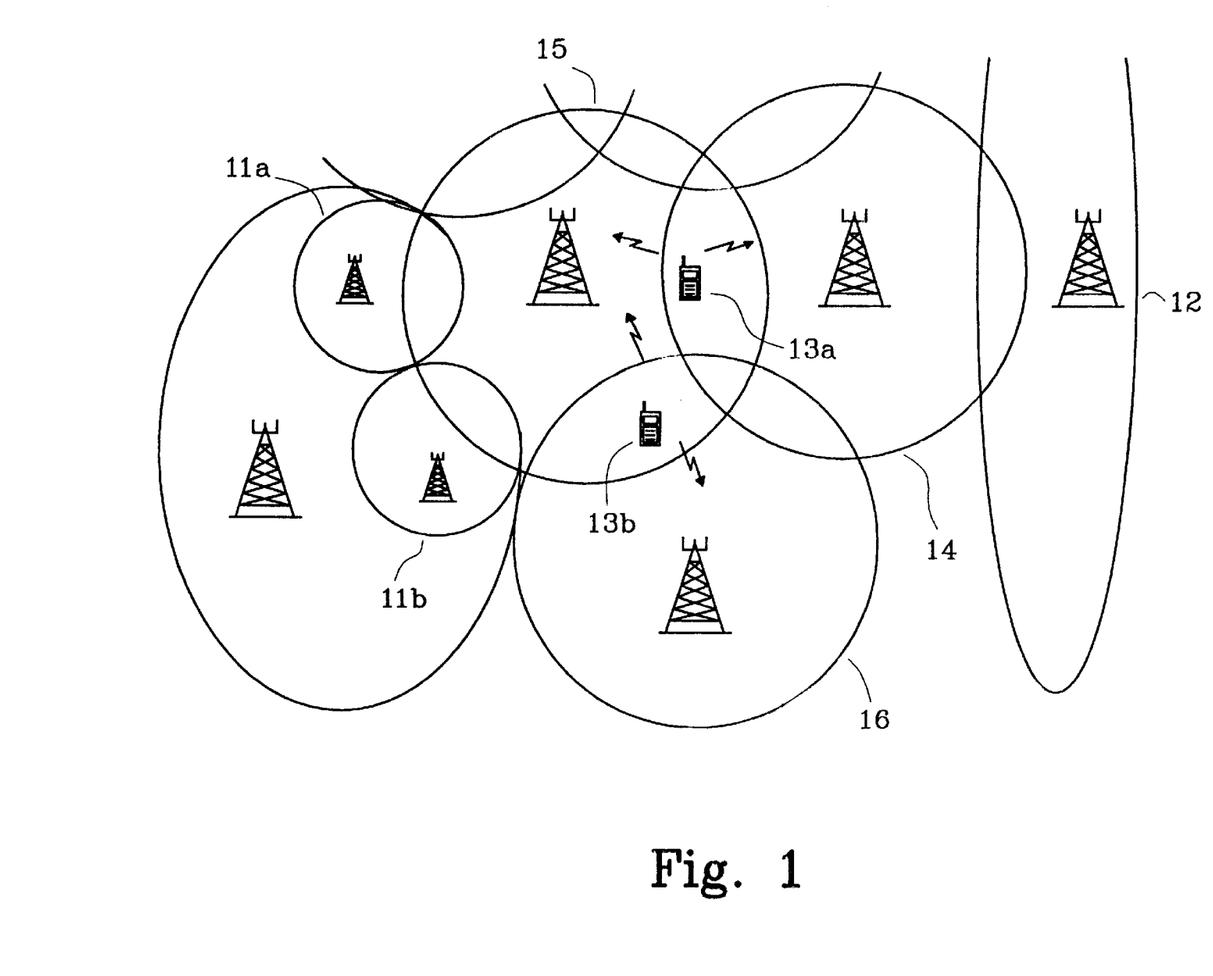
FIG. 1 shows an example of a cell structure in a CDMA-based communication system.

As already mentioned above, a CDMA-based communication system supports a flexible cell structure with no strict borders between neighbour cells. As shown in FIG. 1, cells can be varied in size and/or shape and can even be designed on different cell layers covering the same area by different cells: Smaller cells 11a, 11b might be advantageous, e.g., in order to cover certain areas with high traffic density. Cells 12 can be designed with respect to the velocity of user equipments such that they are elongated along with the direction of that velocity. Different cell types covering the same area could also be applied to distinguish between different types of service or even the user subscription type.

Due to this flexibility in the cell structure, a CDMA-based communication system must also support soft handovers, i.e. user equipments that move around and have more than one established communication link to a number of radio base stations covering several cells. By this means, a handover is not an abrupt switch from one serving radio base station to another but merely done in such a way that a connection will be established to a new radio base station while a connection to another radio base station is gradually released. When supposing a user equipment at a first location 13a that is covered by two cells 14,15 to which radio base stations the user equipment has an established communication link, moving to a second position 13b that is covered by two cells 15,16 implies that the connection to the radio base station of the remote cell 14 is gradually released while the user equipment intends to establish a new communication link to the radio base station of the nearer cell 16. At a certain location on this way when, e.g., the received downlink transmission power from a cell 14 is decreasing and close to a minimum threshold level, it might happen that a connection to the radio base station of said cell 14 is established and released several times by the user equipment. Correspondingly, a connection to the radio base station of a cell 16 from which the user equipment experiences, e.g., an increasing downlink transmission power, which is close to a minimum threshold level, will also be established and released several times. These frequent changes at certain locations can depend on minor changes and result in oscillating handovers. It is a main object of the present invention to reduce the signalling traffic between user equipment and network in such handover situations. A user equipment must keep track on essentially all cells from which it receives a signal by means of a measurement set, which contains the cell identities of these cells. Said measurement set can be subdivided into a set of active cells, i.e. the cell identities of those cells to which the user equipment has an established communication link, and a control set containing at least the cell identities of neighbour cells of the cells in said active set. The oscillating handover as described above will cause that said cell identities will be added and removed several times to and from the active set. Possibly, the user equipment may also contain information about cells from which the user equipment does not receive a signal at its present location, e.g. at a street corner, but that have been indicated by the network for some reason, e.g. because the received downlink signal quality will increase rapidly when the user equipment moves around said corner.

As it is desirable to have always the best cells in the active set, a first aspect of the method and arrangement according to the present invention intends to delegate a handover decision not to either the user equipment or the network but instead to make a common decision. The decision in the network can be made by an appropriate unit in the network, e.g. the radio network controller (RNC) or a radio base station (RBS). This delegation is advantageous because the attribute 'best' can be defined by means of various decision criterions and, as explained in the following, depends also on the fact whether it is the user equipment or said appropriate network unit that applies said criterions:

From the point of view of a user equipment, cells are ranked mainly with respect to criterions referring to the received downlink signal quality from the various radio base stations that serve said cells. A user equipment thus always intends to have an established communication link to the radio base station of the cell that provides the most favourable communication channel. Therefore, possible decision criterions relate to, e.g., the received downlink power level, the experienced signal-to-interference level, or the pathloss. Said criterions may in addition also include a time aspect, i.e. signal levels that are experienced to be sufficiently constant and/or greater than a certain threshold value.

From the point of view of the network, handover decisions are not only made in order to optimise the transmission and receiving conditions for a single user equipment but in order to optimise the total network capacity. Thus, for the network, the handover request of a user equipment is only one aspect in making a decision. In addition to this, the network can involve other parameters, too. The radio base station of a cell that already serves a large number of user equipments, e.g. indicated by a high noise interference level in the cell or with regard to a limitation of the total downlink power level of the radio base station, may reject a handover request, i.e. not accept any new user equipment at the moment. The network may also observe the cell structure in the surrounding of a user equipment and instead suggest that a user equipment should try to establish a connection to another cell. This could be a cell that the user equipment is not aware of at the moment, e.g. due to a momentary shadowing effect, or a cell that is adapted for specific type of users, e.g. with regard to a certain service or subscription class. Another possibility are cells that are adapted for users moving with a high velocity.

While a user equipment makes a handover decision based on individual measurement results and intends to optimise its own communication conditions, the network has a more general knowledge and can make decisions that base on the one hand on the handover decision of the user equipment and on the other hand on general network parameters, e.g. the total network load and/or network capacity, and intends to optimise the transmission conditions for a majority of the C user equipments. Other parameters that the network can take into account relate to traffic patterns, i.e. to which cell or cells the user equipment has been connected earlier. Apparently, it is possible to delegate the main responsibility for handover decisions rather to the user equipment, i.e. to prefer individual decisions, or to the network, i.e. to prefer centrally controlled decisions. This could be advantageous, e.g., with regard to cell load or with regard to a specific geographical environment. It might be suitable to delegate the handover decision rather to the user equipment in case of a low network load and/or in a difficult terrain and to delegate the handover decision rather to the network in case of a high network load and/or easier terrain conditions.

Figure 2:
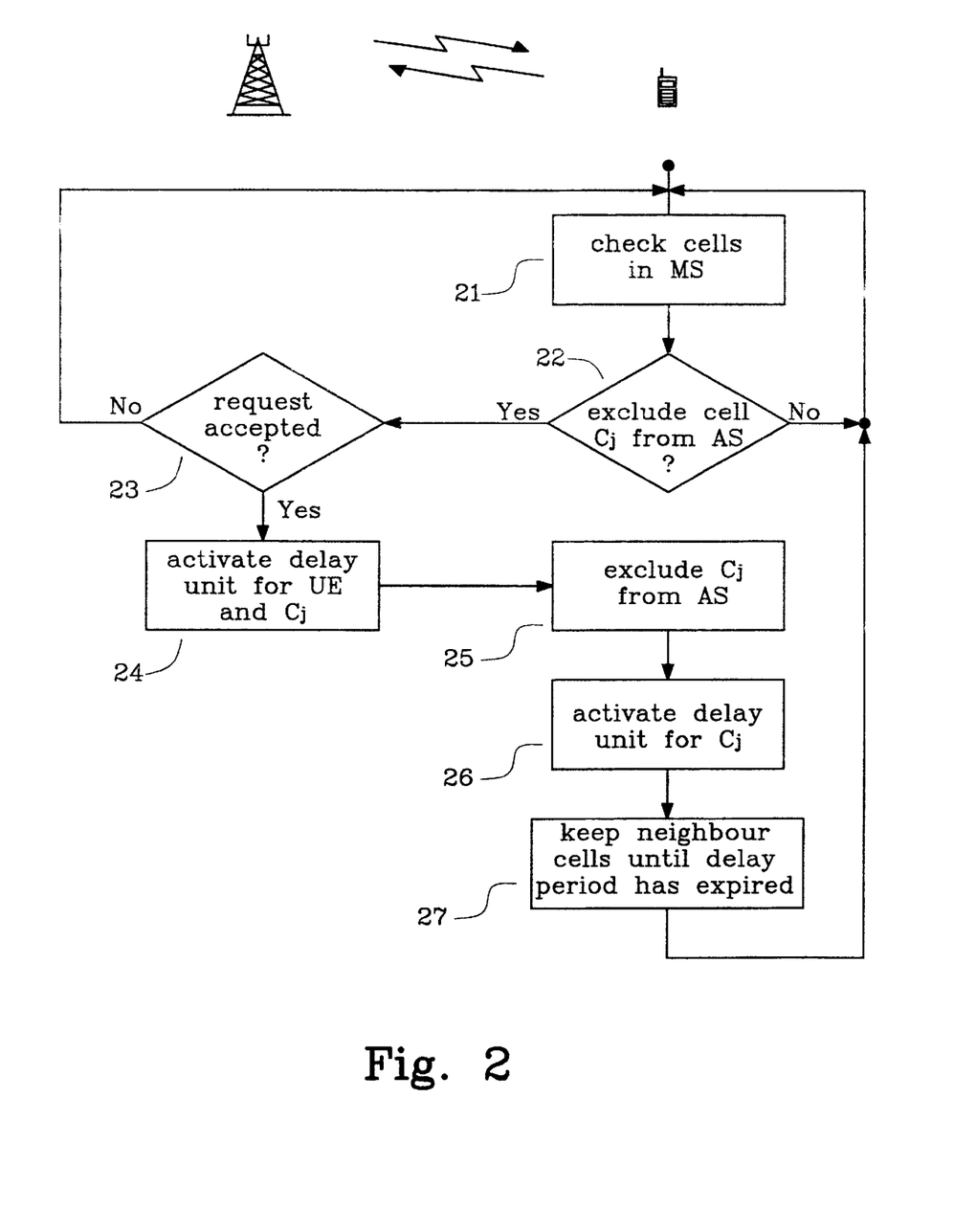
FIG. 2 shows a flowchart of the method according to the present invention for excluding a cell from the active set of a user equipment.
Figure 3:
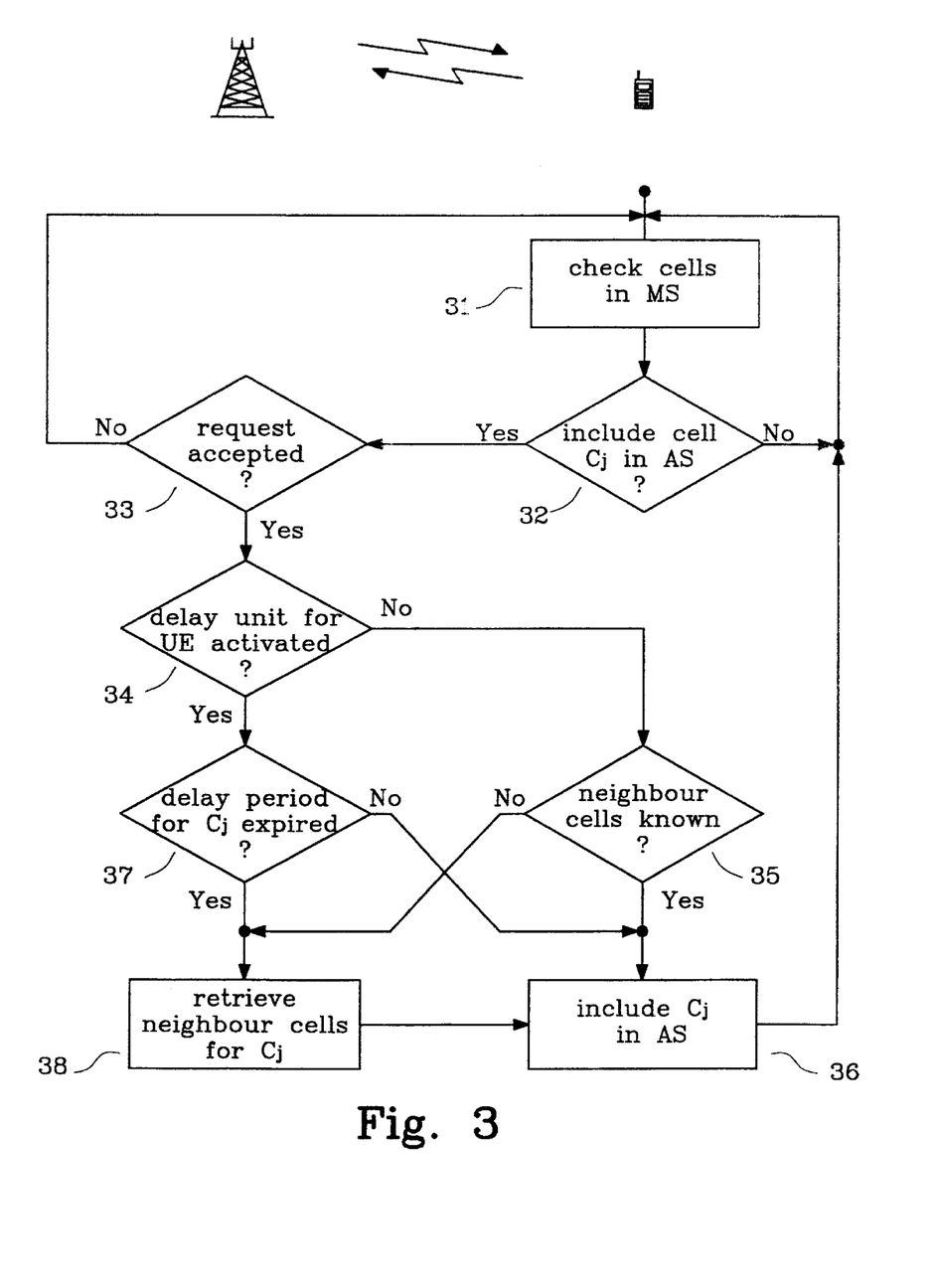
FIG. 3 shows a flowchart of the method according to the present invention for including a cell to the active set of a user equipment.

The following FIGS. 2 and 3 show flowcharts representing the various steps of the method for performing a handover, i.e. a change of cells in the active set, according to the present invention. In particular, in accordance with a first aspect of the present invention, said figures intend to demonstrate the way in which a handover decision is made by both the user equipment and said appropriate network unit. In accordance with a second aspect of the present invention, said figures demonstrate the way in which the signalling traffic can be considerably reduced for oscillating handovers. Both figures describe a handover that is initiated by the user equipment. However, corresponding method steps could also be applied for a handover that is initiated by an appropriate unit in the network.

FIG. 2 shows the various steps of the method according to the present invention that are performed in the user equipment and the appropriate network unit in order to exclude the cell identity of a cell from the active set. A user equipment always keeps track on received signals from those radio base stations that are represented in its measurement set (MS) by means of their cell identities, block 21. The communication links to cells in the active set (AS), i.e. to which radio base station the user equipment has an established communication link, are measured in particular. As explained above, a user equipment always intends to have the best cells in its active set in order to achieve sufficiently good transmission conditions at any time and checks therefore the cells in the active set in accordance with certain decision criterions, block 22. Depending i.a. on said transmission conditions in general, this must be done continuously or within certain periods of time. A cell identity is kept in the active set as long as the corresponding cell appears to be sufficiently good with respect to one or more appropriate decision criterion, block 22 No. However, if a cell $C_j$ does not appear to fulfil one or more of said criterions, the user equipment makes a preliminary decision to exclude the corresponding cell identity from the active set, block 22 Yes, and sends an appropriate request to said network unit. As these decisions are not made by either the user equipment or the network but merely by both parts, a decision is founded on several aspects from different points of view. This means that the network will check a request to exclude said cell $C_j$ according to other criterions. The network has the possibility to reject the request, block 23 No, or to accept the request, block 23 Yes. If said request is accepted, block 23 Yes, the cell identity of the cell $C_j$ is excluded from the active set, block 25.

As it has been experienced to be a problem that the cell identity of a candidate cell is included or excluded several times to and from the active set until a new and stable active set has been established, it is another aspect of the present invention to reduce the amount of signalling traffic due to this oscillating handovers. Therefore, even if a cell identity of a candidate cell $C_j$ has been excluded from the active set, block 25, information about its neighbour cells is still kept in the user equipment for a certain time period, block 27. This relates particularly to those neighbour cells that have no longer a neighbour cell in the modified active set without said candidate cell $C_j$. These neighbour cells are either kept in the measurement set or, alternatively, information about these cells is stored in the user equipment without performing measurements on them. Said time period is controlled by means of a delay unit that is implemented in at least the user equipment or in both user equipment and an appropriate network unit, e.g., the radio network controller or the radio base station. When a cell identity of a cell $C_j$ has been excluded from the active set of a user equipment and has been moved to the measurement set, said delay unit is activated for said cell $C_j$, block 26, and denotes how long the identities of those neighbour cells, which have no other neighbours than said excluded cell in the active set, shall be kept, e.g., in the measurement set. Accordingly, such a delay unit can furthermore be activated in the radio base station, block 24. If the identity of the excluded candidate cell $C_j$ shall be re-added to the active set before the delay period has expired it is not necessary to retrieve the identities of the neighbour cells of said candidate cell. Implementing a delay unit in both user equipment and said appropriate network unit will further reduce the signalling traffic that is necessary for including a previously excluded cell to the active set and including its neighbour cells to the measurement set. This will be explained in greater detail in FIG. 3.

Figure 6:
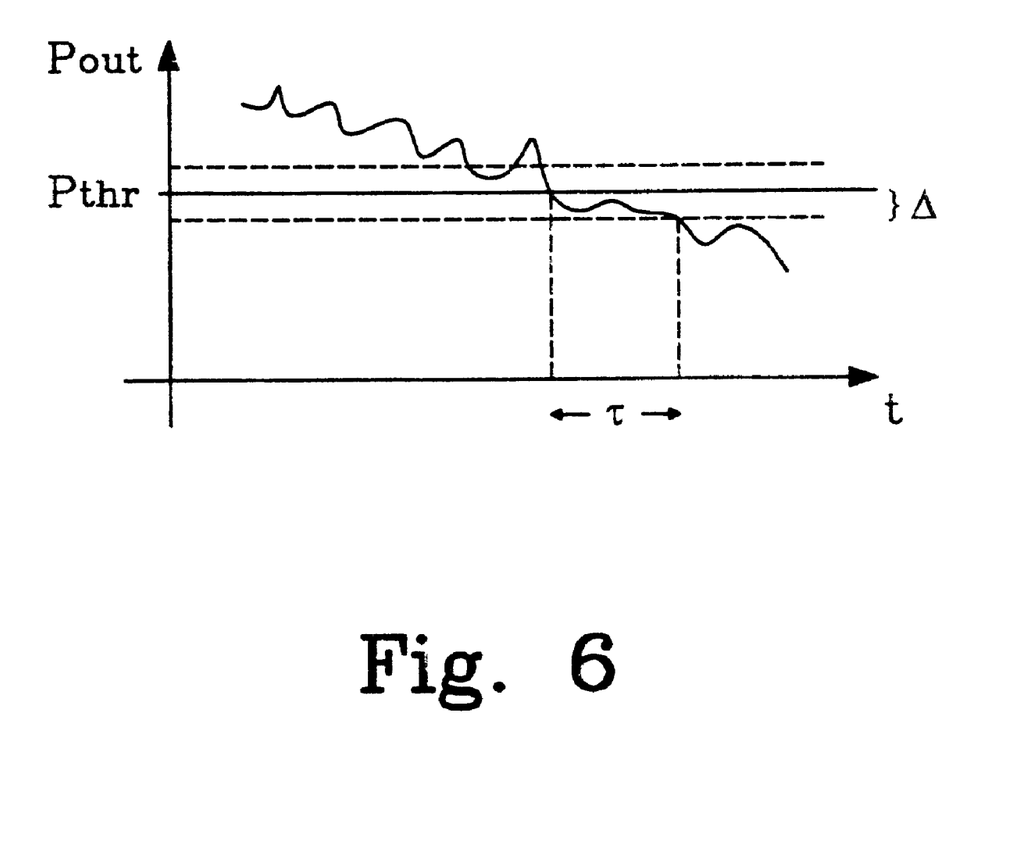
FIG. 6 shows an example how a delay period can be determined by applying a certain delay criterion, e.g., the received downlink power from a radio base station.

Said delay unit can be implemented in such a way that a delay period τ is specified, e.g., explicitly by means of a timeout value or by means of the width Δ of a tolerance area below or above a threshold level for an appropriate measurement value. Defining a delay by means of a timer value is considerably simple and will in normal cases result in a sufficient decrease of the number of oscillating handovers. However, defining a delay by means of a distance of a measurement value from a threshold level will allow more flexibility due to the possibility to select appropriate delay criterions. This is demonstrated in FIG. 6 by means of an example: Here, the received downlink power $P_{out}$ from the radio base station of a cell that recently has been removed from the active set is applied as a delay criterion. In this example the delay criterion is the same as the criterion that is applied to decide whether a cell shall be removed from the active set. If the measurement values for the received downlink power of a candidate cell decrease below a threshold level $P_{thr}$, said cell is excluded from the active set but the identities of the neighbour cells of said cell are not removed until the received downlink power level is below a tolerance area with width Δ below said threshold level $P_{thr}$. By this means the identities of said neighbour cells are kept for a delay period τ. It is likewise possible to apply different criterions for the decision to exclude a cell from the active set and for the determination of the delay period within which information about the neighbour cells of the excluded cell is kept in the user equipment. Then, the delay period τ starts when a cell no longer complies with the decision criterion, i.e. the cell is excluded from the active set, and ends when the cell no longer complies with the delay criterion.

Thus, a critical parameter with regard to a minimisation of the handover-related signalling traffic is to choose a delay period within which the identities of neighbour cells of a candidate cell are kept, e.g., in the measurement set of a user equipment after said candidate cell has been excluded from the active set. Generally, if said delay period is chosen too small, the identities of neighbour cells of a cell that has been excluded from the active set will have been removed before the cell identity of said excluded cell shall be re-added such that the identities of the neighbour cells must be retrieved nevertheless. However, if said delay period is chosen too large, the identities of neighbour cells of an excluded cell might occupy the measurement set for a too long time. This is a disadvantage because the user equipment has only a limited measurement capacity. In the simplest case, an appropriate delay period can be defined by a general default value. When applying a timer, typical values are in a range between 0.5s and 3s. Alternatively, it is also possible to define appropriate delay periods that are adapted to certain cell specific properties, e.g., the environmental conditions in a cell or the cell size. Thus, for a difficult cell environment, e.g. urban or hilly terrain, that can cause a larger number of oscillating handovers, it is recommendable to choose a larger value for the delay period than for a propitious environment causing only few oscillating handovers. With respect to the cell size, it appears to be advantageous to define for small cells smaller delay periods than for larger cells.

FIG. 3 shows the various steps of the method according to the present invention that are performed in the user equipment and an appropriate unit in the network in order to include a cell identity of a candidate cell from the measurement set to the active set. A user equipment checks all cells in its measurement set (MS), i.e. essentially those cells from which it receives radio signals, block 31, and each cell in the measurement set will be judged according to certain decision criterions. If the radio signals from a radio base station of a candidate cell $C_j$, which presently is not in the active set, appear to fulfil one or more of said decision criterions, block 32 Yes, the user equipment will request to include the cell identity of this cell $C_j$ in the active set (AS). The network will check said request according to its own criterions as described above and either reject the request, block 33 No, or accept the request, block 33 Yes.

As mentioned above, it is not necessary for the appropriate network unit to have an implemented delay unit that indicates whether neighbour cells of a cell whose cell identity has been excluded from the active set of a user equipment are still kept in the measurement set. In cases where no such delay unit is implemented, block 34 No, said network unit only transmits a confirmation of the request and it is up to the user equipment to retrieve the neighbour cells if necessary. If the delay period, which starts when the cell identity of a candidate cell has been excluded, has not yet expired the user equipment still knows the cell identities of the neighbour cells when such a candidate cell $C_j$ shall be re-added to the active set, block 35 Yes. In this case it is sufficient to include the cell identity of the candidate cell $C_j$ in the active set, block 36, and no further measures must be taken. If the neighbour cells of the candidate cell $C_j$ are not known, block 35 No, either because the delay period for said cell has expired nevertheless or because said cell has never been added before in this oscillating phase, the user equipment must send another request to said network unit in order to retrieve said neighbour cells. Thus, it becomes apparent that one advantage of the present invention results from the fact that it is not necessary to retrieve and send the cell identities of neighbour cells each time when a recently excluded cell identity shall be re-added within a time interval that is less than the delay period $\tau$ that is denoted by the delay unit. If said delay period is appropriately chosen, it is only necessary to send this information if a cell identity is added for the first time in an oscillating phase.

Said signalling traffic can be reduced even more if a delay unit is also implemented in the appropriate network unit, block 34 Yes. By this means, this network unit is aware of whether a cell identity has recently been excluded from the active set of a user equipment. Consequently, as long as the delay period for said cell has not expired the network knows whether or not the identities of the neighbour cells of said excluded cell are still kept in the measurement set of the user equipment, block 37. Advantageously, it is not necessary to send information of the identities of neighbour cells of a recently excluded cell if said delay period has not yet expired, block 37 No. However, the network will automatically send this information, block 38, if such a delay period has expired, block 37 Yes. As this is done automatically, a reduction of signalling traffic is achieved because the user equipment need not to send an extra request for retrieval of these neighbour cell identities to the network.

Figure 4:
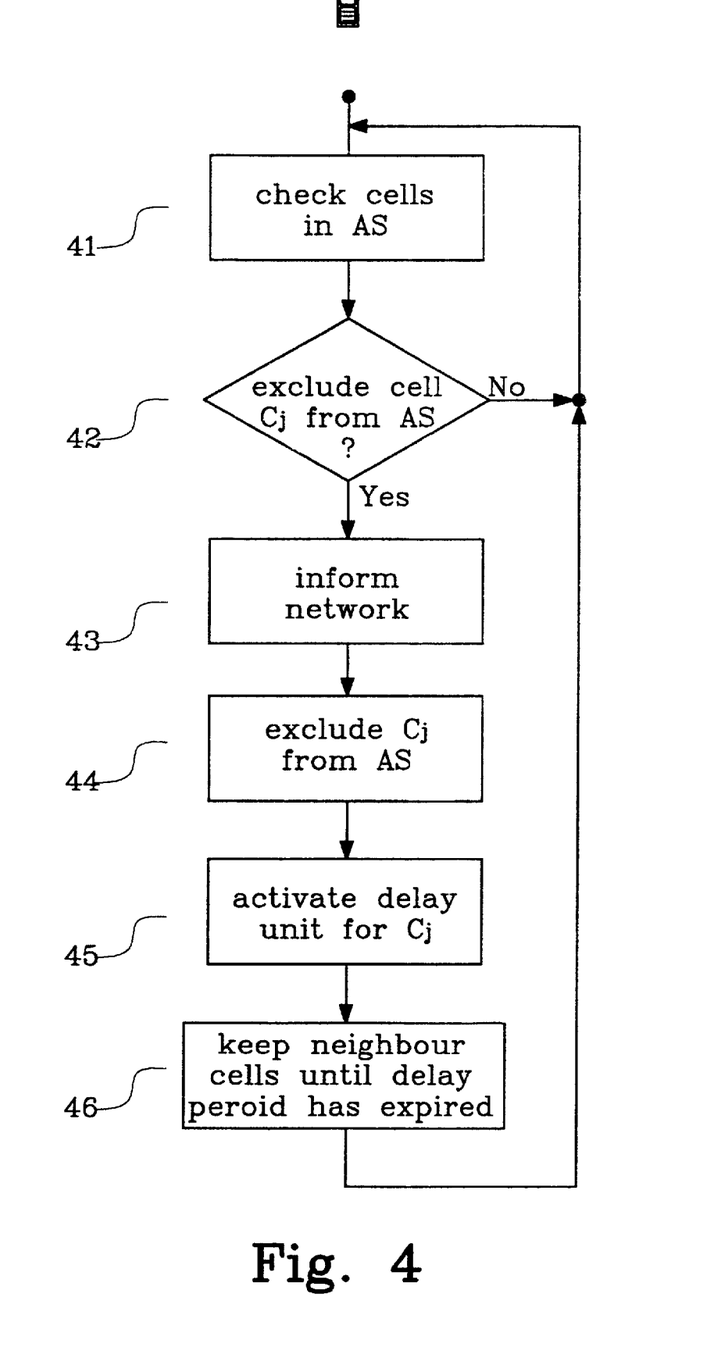
FIG. 4 shows a flowchart of an alternative method according to the present invention for excluding a cell from the active set of a user equipment.
Figure 5:
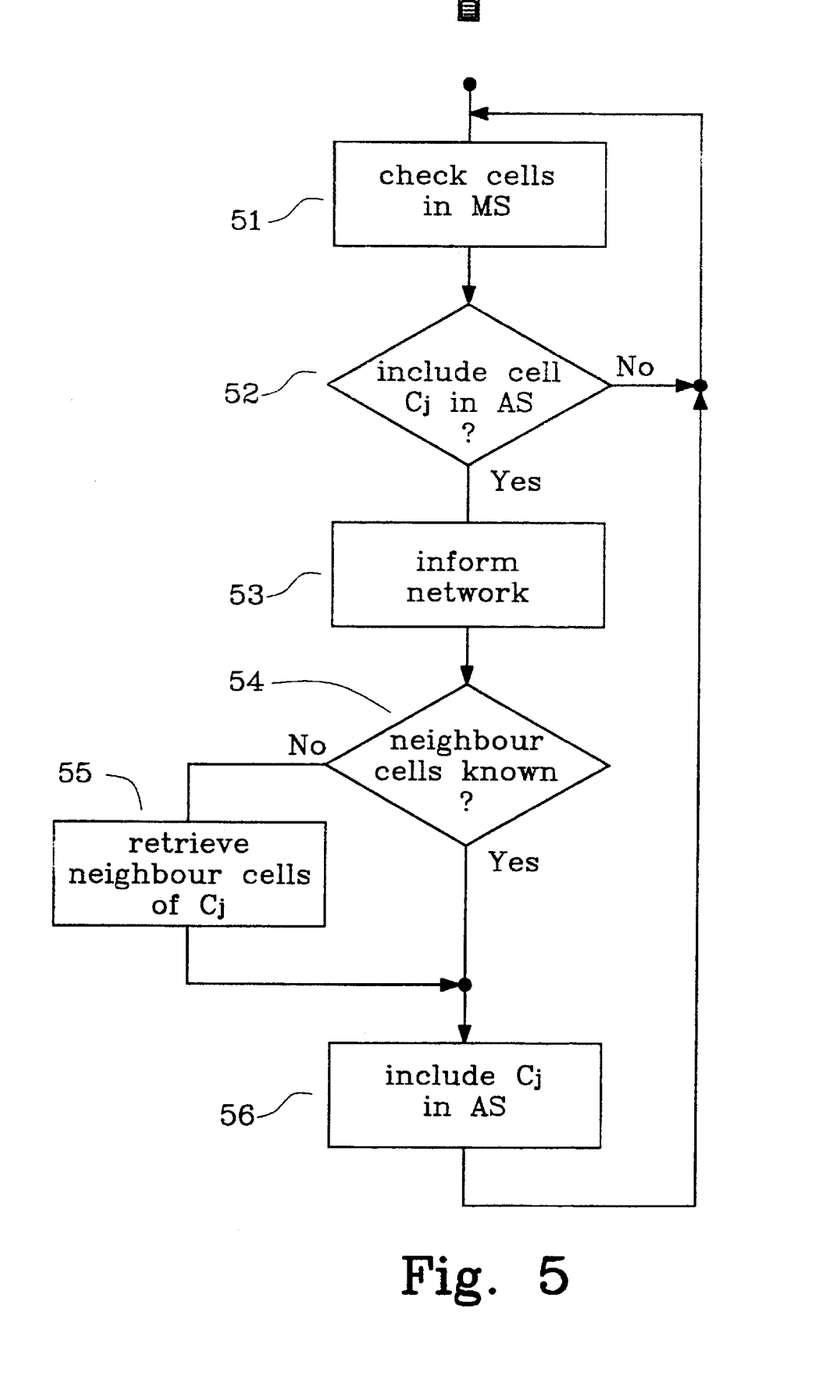
FIG. 5 shows a flowchart of an alternative method according to the present invention for including a cell to the active set of a user equipment.

FIGS. 4 and 5 describe alternative methods for including and excluding of cell identities to and from the active set of a user equipment. The method as presented in these figures is modified inasmuch as the network is only informed about the changes in the active set of a user equipment; however, without the need to accept or reject said changes. Here, the network acts only in accordance with requests from a user equipment, e.g., if necessary, retrieving of neighbour cell identities of a cell whose identity shall be included in the active set. By this means, the amount of signalling information that must be sent in case of an oscillating handover can be reduced.

FIG. 4 describes the alternative method for excluding a cell identity from the active set. The user equipment measures the cells in its active set (AS), block 41, and informs the network, block 43, if it decides to exclude one of the cell identities of a cell $C_j$ from the active set, block 42 Yes. Then, a delay unit is activated, block 45, and started when the cell identity of said cell $C_j$ has been excluded from the active set, block 44. In consequence of this, the identities of the neighbour cells of the excluded cell $C_j$ are kept in the measurement set at least until a delay period has expired, block 46.

Correspondingly, FIG. 5 describes the alternative method for including the cell identity of a candidate cell $C_j$ in the active set. The user equipment checks the cells in its measurement set (MS), block 51. If a cell identity of a cell $C_j$ shall be included in the active set, block 52 Yes, the user equipment informs the network about the change in its active set, block 53, and checks whether the neighbour cell identities of this candidate cell $C_j$ are known, block 54, i.e. whether said cell has recently been excluded from the active set and a delay period for keeping information about the neighbour cells in the user equipment has not yet expired. If said neighbour cell identities are known, block 54 Yes, the identity of the candidate cell $C_j$ can be included in the active set, block 56, and no further measures must be taken. If said neighbour cell identities are not known, e.g. because the delay period for said neighbour cell identities has expired or because said cell has never been added to the active set in this oscillating phase, the user equipment must at first retrieve these neighbour cell identities from the network, block 55, and can then include the cell identity of the candidate cell $C_j$ in the active set, block 56.

What is claimed is:

1. Method related to a handover decision of a user equipment in a telecommunication system comprising a plurality of cells, each of which served by a corresponding radio base station, the user equipment comprising a measurement set containing cell identities of cells that the user equipment is aware of, said measurement set being subdivided into an active set containing cell identities of cells to which radio base station the user equipment has an established communication link, a control set containing at least the identities of neighbour cells of said cells in the active set, characterised in the user equipment performing the steps of releasing an established communication link to a radio base station of a candidate cell in the active set of the user equipment, if said cell does not comply with one or more decision criterions, and excluding (25,44) the cell identity of said candidate cell from the active set, activating a delay unit (24,26,45) with definable delay period when the cell identity of said candidate cell is excluded from the active set (25,44), excluding the cell identities of cells without at least one neighbour cell in the changed active set from the measurement set not until said delay period has expired (27,46).

2. Method according to claim 1, characterised in storing information about cells that have been removed from the measurement set in an appropriate storage unit in the user equipment for a definable period of time.

3. Method according to claim 1, characterised in establishing a communication link to a radio base station of a candidate cell in the control set of the user equipment, if said cell complies with one or more decision criterions, whereby the cell identity of said cell has previously been included in the active set, and re-adding (36,56) the cell identity of said candidate cell to the active set, retrieving the neighbour cells of the candidate cell whose cell identity shall be re-added to the active set of the user equipment if the delay period has expired (35No, 54No).

4. Method according to claim 1, characterised in informing (43,53) the network about an intended change in the active set.

5. Method according to claim 1, characterised in sending a request to the network (22Yes,32Yes) whether an intended change in the active set is accepted or rejected, obeying the decision of the network.

6. Method according to claim 5, characterised in an appropriate unit in the network performing the steps of accepting a request for a change in the active set of a user equipment (23Yes,33Yes) if the candidate cell complies with one or more decision criterions, rejecting a request for a change in the active set of a user equipment (23No,33No) if the candidate cell does not comply with one or more decision criterions.

7. Method according to claim 6, characterised in activating a delay unit (24) with a definable delay period when a request to exclude a cell identity of a candidate cell from the active set of a user equipment has been accepted, retrieving the neighbour cells of the candidate cell whose cell identity shall be re-added to the active set of the user equipment (38) if the delay period has expired (37Yes).

8. Method according to claim 1, characterised in defining a common delay period for all cells in the delay units of the user equipments and the appropriate network units.

9. Method according to claim 1, characterised in defining a cell specific delay period in the delay units of the user equipments and the appropriate network units.

10. Method according to claim 1, characterised in measuring a delay period by means of a timer value such that the delay period expires when a timeout value is reached.

11. Method according to claim 1, characterised in measuring a delay period by means of a tolerance area around a threshold level of an appropriate measurement value such that the delay period expires when said measurement value is beyond said tolerance area.

12. Method according to claim 1, characterised in applying the received downlink power level from a radio base station as a decision criterion in the user equipment.

13. Method according to claim 1, characterised in applying the signal interference level in a cell as a decision criterion in the user equipment.

14. Method according to claim 1, characterised in applying the pathloss as a decision criterion in the user equipment.

15. Method according to claim 6, characterised in applying the cell load as a decision criterion in the network.

16. Method according to claim 6, characterised in applying the type of service that is requested by the user equipment as a decision criterion in the network.

17. Method according to claim 6, characterised in applying traffic patterns of the user equipment as a decision criterion in the network.

18. Method according to claim 6, characterised in applying the subscription type of the user equipment as a decision criterion in the network.

19. Arrangement in a telecommunication system comprising of a plurality of cells, each of which served by a corresponding radio base station, and at least one user equipment, the user equipment comprising a measurement set containing cell identities of cells that the user equipment is aware of, said measurement set being subdivided into an active set containing cell identities of cells to which radio base station the user equipment has an established communication link, a control set containing at least the identities of neighbour cells of said cells in the active set, characterised in a delay unit in the user equipment (13b) that is activated when a cell identity of a candidate cell (15) is excluded from the active set of the user equipment (13b) and indicates when cells without at least one neighbour cell in the changed active set of the user equipment (13b) shall be excluded.

20. Arrangement according to claim 19, characterised in a delay unit in an appropriate network unit that is activated when a candidate cell (15) is excluded from the active set of the user equipment (13b) and that indicates when cells without at least one neighbour cell in the changed active set of the user equipment (13b) shall be excluded.

21. Arrangement according to claim 19, characterised in said delay unit being implemented as a timer.

22. Arrangement according to claim 19, characterised in said delay unit being implemented as a measurement unit that compares a measurement value with a threshold value.

* * * * *